United States Patent
Baugh

(10) Patent No.: US 8,200,056 B2
(45) Date of Patent: Jun. 12, 2012

(54) MULTI-FIBER INTERFACE TO PHOTONIC SUBASSEMBLY

(75) Inventor: Brenton A. Baugh, Los Altos, CA (US)

(73) Assignee: Lightwire LLC, San Jose, CA (US)

(*) Notice: Subject to any disclaimer, the term of this patent is extended or adjusted under 35 U.S.C. 154(b) by 325 days.

(21) Appl. No.: 12/577,901

(22) Filed: Oct. 13, 2009

(65) Prior Publication Data

US 2011/0085763 A1      Apr. 14, 2011

Related U.S. Application Data

(60) Provisional application No. 61/196,286, filed on Oct. 16, 2008.

(51) Int. Cl.
*G02B 6/30* (2006.01)
*G02B 6/38* (2006.01)
(52) U.S. Cl. ............................ 385/49; 385/65; 385/83
(58) Field of Classification Search .................. None
See application file for complete search history.

(56) References Cited

U.S. PATENT DOCUMENTS

| | | | |
|---|---|---|---|
| 4,883,743 A | | 11/1989 | Booth et al. |
| 5,339,376 A | | 8/1994 | Kakii et al. |
| 5,359,686 A | | 10/1994 | Galloway et al. |
| 6,163,639 A | * | 12/2000 | Ollier et al. .................. 385/52 |
| 6,795,634 B2 | | 9/2004 | Jeong et al. |
| 6,859,588 B2 | | 2/2005 | Kim et al. |
| 6,866,426 B1 | * | 3/2005 | Steinberg et al. ............... 385/83 |
| 7,587,108 B2 | | 9/2009 | Carpenter et al. |
| 2003/0142922 A1 | | 7/2003 | Dallas et al. |
| 2005/0163431 A1 | | 7/2005 | Moynihan et al. |
| 2006/0291782 A1 | * | 12/2006 | Carpenter et al. ............... 385/49 |

\* cited by examiner

*Primary Examiner* — Tina Wong
(74) *Attorney, Agent, or Firm* — Wendy W. Koba

(57) ABSTRACT

A multiple piecepart alignment and attachment configuration for mating a fiber array (or even a single fiber) with a silicon photonic subassembly utilizes ever-tightening alignment tolerances to align the fiber array with a similar array of waveguides (or other devices) formed within the photonic subassembly. A box-shaped fiber holder is formed to include a plurality of grooves within its bottom interior surface to initially support the fiber array. A separate piecepart in the form of a lid is mated to, and aligned with, the silicon photonic subassembly. The lid is formed to include registration features on its underside that fit into alignment detents formed in the top surface of the silicon photonic subassembly upon attachment. The lid also includes a number of grooves formed on its underside that will capture the top surface of the fibers as the fiber holder is slide into place over the lid. The grooves within the lid function to tighten the pitch of the fiber array and ultimately control the lateral and vertical alignment between the fiber array and the subassembly. The subassembly is also formed to include etched channels along the endface (the channels aligned with optical waveguides/devices in the substrate) to mate with the fiber holder, where the optical fibers are ultimately positioned within the channels so as to be in alignment with the optical waveguides/devices.

6 Claims, 6 Drawing Sheets

MULTI-FIBER INTERFACE TO PHOTONIC SUBASSEMBLY

CROSS-REFERENCE TO RELATED APPLICATIONS

This application claims the benefit of U.S. Provisional Application No. 61/196,286, filed Oct. 16, 2008.

TECHNICAL FIELD

The present invention relates to a system for mechanically aligning a fiber array to a photonic subassembly and, more particularly, to a multiple piecepart alignment configuration where a fiber array is presented to consecutively tighter and tighter alignment tolerances until the array is ultimately presented to, and aligned with, a photonic subassembly.

BACKGROUND OF THE INVENTION

Inasmuch as optical fibers are characterized by a wide transmission bandwidth and relatively low attenuation, they are particularly well-suited for communications applications. However, optical fiber interfaces to electronic and optical networks tend to be expensive to manufacture—usually as a result of the difficulty associated with mounting optical transmitting and receiving devices on a substrate and separately aligning each one of these devices with an optical fiber. For this reason, optical fiber technology has been widely implemented in long-haul communications systems where the interfaces are relatively few. However, the high cost of manufacturing fiber optic interfaces has been a barrier that has slowed the penetration of the fiber optic technology into other markets, such as local metropolitan area communication networks, for example.

A typical single mode fiber has a core diameter of approximately nine microns, while a multimode fiber has a core diameter of approximately 50 or 62.5 microns. Because of the small dimensions of optical fiber cores, aligning optical fibers with optical transmitting devices, which have aperture sizes that vary from approximately 2 to 10 microns, is difficult. Obviously, the problem is particularly acute when the optical devices are to be aligned with single mode fiber.

Many efforts have been made to incorporate alignment schemes between a fiber array and an array of corresponding waveguides on a planar photonic subassembly. One such effort is described in U.S. Pat. No. 5,482,585, issued to Ota et al. on Jan. 9, 1996 and entitled "Process for Optically Joining an Optical fiber Array to an Opponent Member". The Ota et al. patent describes a method in which an optical fiber array is initially formed by affixing optical fibers between a V-grooved base plate and a similarly-grooved top plate. The optical fibers of the optical fiber array are optically joined to an optical substrate (i.e., the "opponent member") by using, as a joining reference surface, either one of a first surface of the fixing base plate at which the optical fibers are fixed and a second surface of the fixing base plate opposite to the surface.

Another effort is described in U.S. Pat. No. 5,339,876 issued to Kakii et al. on Aug. 16, 1994 and entitled "Grooved Optical Fiber Connection Incorporating Elastic Guide Pin Pressing Members". The Kakii et al. patent describes an optical connector for connecting optical fibers comprising a guide-groove substrate having grooves for positioning optical fibers and guide pins; an upper plate having groove portions each for covering the guide pins positioned in the guide grooves of the guide-groove substrate; elastic guide-pin pressing members each provided in the groove portions of the upper plate above portions where the guide pin grooves are in contact with the guide pins.

U.S. Pat. No. 7,587,108 issued to B. S. Carpenter et al. on Sep. 8, 2009 discloses an arrangement for attaching a "cantilevered" fiber array to a planar lightwave circuit. In particular, the cantilevered fiber array comprises a base member for supporting the fiber array, with a cover lying over the base member, where a terminal end of the fiber array extends beyond an end of at least one of the cover or base, forming a cantilevered structure. The terminal end of the fiber array is then disposed in an alignment groove formed in the planar lightwave circuit to provide optical coupling between the fiber array and the optics formed in planar lightwave circuit.

While such efforts provided some means of alignment between a fiber array and a waveguide array, there remains a need for an arrangement for interconnecting a fiber array with a planar photonic subassembly that permits the use of low-cost alignment techniques, while relaxing manufacturing tolerances on the various components and permitting the use of inexpensive materials (such as plastics) for at least a portion of the structure.

SUMMARY OF THE INVENTION

The need remaining in the prior art is addressed by the present invention, which relates to a fiber array alignment system and interface structure and, more particularly, to a multiple piecepart alignment configuration where a fiber array is presented to consecutively tighter and tighter alignment tolerances until the final mating and interface of the fiber array to a photonic subassembly is achieved.

In particular, the invention consists of three separate components: a box-shaped fiber holder, a grooved lid and a silicon photonic subassembly. The box-shaped fiber holder component includes an array of grooves formed along the inner surface of the bottom of the box, where the grooves are used to support the individual fibers from an incoming fiber array. In accordance with the present invention, the fiber holder sets an approximate pitch (fiber-to-fiber spacing in the "x" direction), maintaining that pitch within a variation of approximately ±15 (in one exemplary embodiment). The fiber holder also roughly positions the elevation of the fibers for presentation to the grooved lid (e.g., within about 100 µm in the "z" direction). Lastly, the endfaces of the individual fibers are fixed along the "y" direction with respect to the fiber holder groove termination with a placement tolerance on the order of, for example, ±10 µm.

The grooved lid and silicon photonic subassembly components are formed in accordance with the present invention to include registration features and alignment detents, respectively, that will mate when these two components are joined together and provide mechanical/optical alignment therebetween. The mating of the registration features and alignment detents has been found to provide alignment tolerances of approximately ±10 µm (in one exemplary embodiment) between the two components along all three axis. The grooved lid includes a plurality of underside grooves that will capture the optical fibers and refine their elevation from the above-mentioned 100 µm tolerance to approximately ±10 µm in the "z" direction as the fiber holder is slid into place over the grooved lid.

As the components are mated, the "x" direction position of the fiber is further constrained by a series of etched channels formed within an endface of the silicon photonic subassembly. The channels are precisely etched and aligned with waveguides formed on the subassembly to achieve positional tolerance on the order of, for example, ±1 μm in the "x" direction; therefore, as the fibers are guided into place from the fiber holder and along the grooved lid, the alignment tolerances will become tighter and tighter until the optical fibers enter into the well-defined spaces between the channels and become aligned with the optical waveguides. Final alignment tolerances are thus expected to be essentially the same in both the "y" and "z" directions (e.g., several microns, for example ±10 μm), and even less in the "x" direction (e.g., a few microns, for example ±2 μm). It is to be understood, however, that tighter tolerances can be achieved with the multiple piecepart configuration of the present invention by, for example, refining the tolerance requirements associated with the grooved lid component. The above exemplary values are considered to be exemplary only and provide an acceptable balance between cost and function, given the current state of the art associated with this technology.

It is an advantage of the interface structure of the present invention that the fiber holder and grooved lid may be formed of relatively inexpensive, common materials (e.g., polymers, ceramics, metals, and the like), providing a relatively inexpensive interface between a fiber array and a silicon photonic subassembly.

Other and further advantages and aspects of the present invention will become apparent during the course of the following discussion and by reference to the accompanying drawings.

BRIEF DESCRIPTION OF THE DRAWINGS

Referring now to the drawings, where like numerals represent like parts in several views.

DETAILED DESCRIPTION

Figure 1:
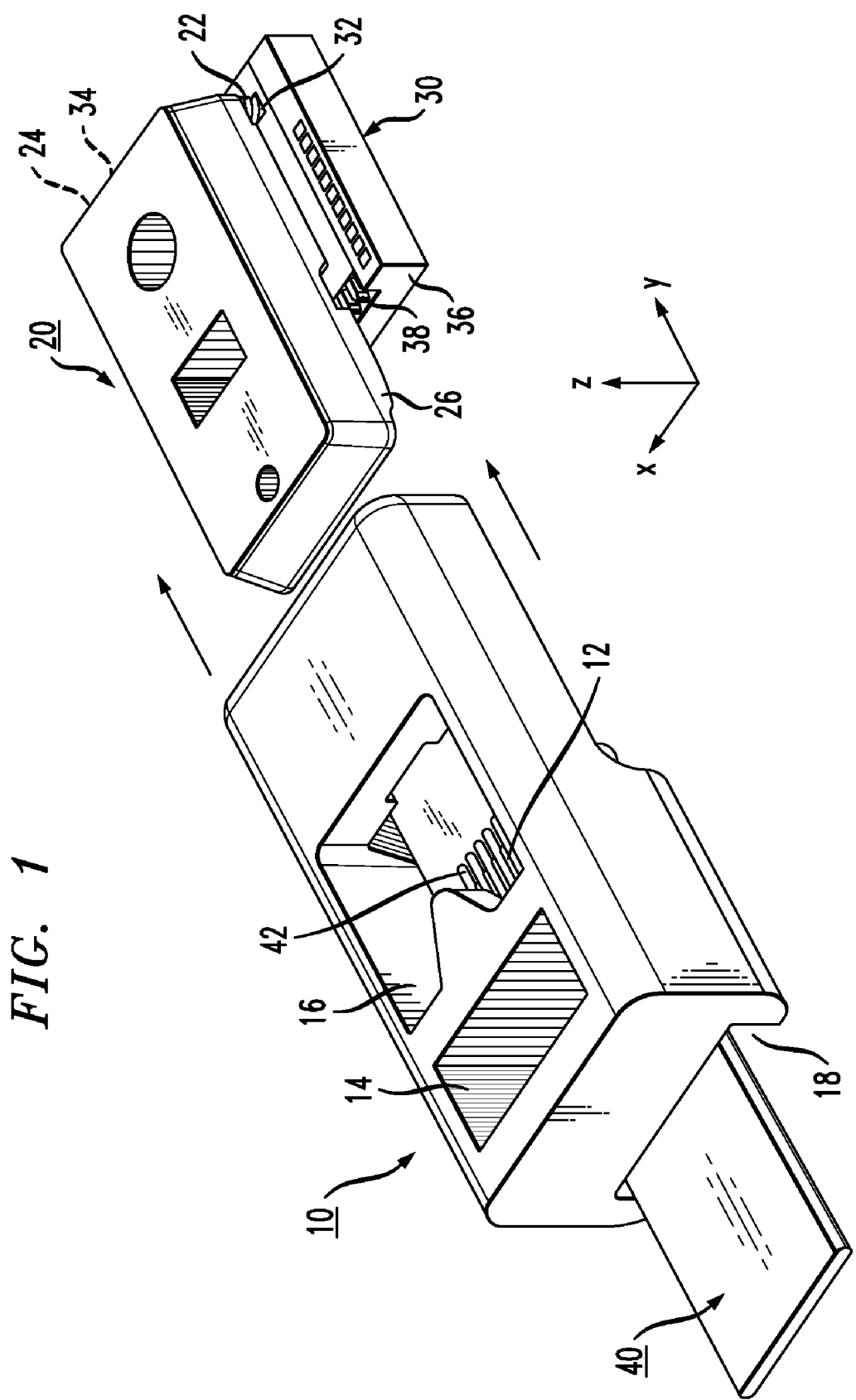
FIG. 1 is an isometric view of an exemplary fiber array interface and alignment structure of the present invention, illustrated in a partially exploded view with the fiber holder shown separately from the attached combination of the grooved lid and silicon photonic subassembly.

As will be described in detail hereinbelow, the present invention relates to a multiple piecepart alignment configuration for providing alignment between a fiber array and a planar photonic subassembly. In particular and as shown in FIG. 1, the invention consists of three separate components: a box-shaped fiber holder 10, a grooved lid 20 and a silicon photonic subassembly 30, with an xyz set of coordinates also shown in FIG. 1. In use, a fiber array 40 is inserted in fiber holder 10, where the individual fibers forming the array are introduced to sequentially tighter alignment tolerances until being ultimately aligned with waveguides (not shown) formed on silicon photonic subassembly 30. An alignment on the order of ±2 μm in the x-axis direction, in combination with a ±10 μm y-axis/z-axis (longitudinal/vertical) alignment has been achieved with one exemplary embodiment of the configuration of the present invention.

The three separate components used to provide this alignment capability will be discussed in detail below. It is to be noted that only photonic subassembly 30 is required to be formed of silicon, where this requirement is also a necessity for forming various ones of the optical waveguides and other optical devices (receiving devices, transmitting devices, passive and/or active devices) within the material thereof. Both the box-shaped fiber holder 10 and the grooved lid 20 may be formed of a less expensive material, such as a conventional industrial polymer, ceramic, or metallic composition. Alternatively, silicon may be used to fabricate either one of both of these components, if desired.

Initially, fiber array 40 is directed into an open side of box-shaped fiber holder 10, where the individual optical fibers 42 will rest in a series of grooves 12 formed along the inner bottom surface 13 of box-shaped fiber holder 10. Grooves 12, as will be discussed below, are formed to define an approximate "pitch" (i.e., fiber-to-fiber spacing) for fiber array 40 and to set a relative elevation (vertical positioning along the z-axis) of the fiber array. Separately, grooved lid 20 is attached to silicon photonic subassembly 30 by using mechanical registration features that define a predetermined alignment between these two pieceparts. In one embodiment, a pair of mechanical reference features 22, 24 are formed on the underside of grooved lid 20 and positioned to mate with a pair of alignment detents 32, 34 on the top surface of silicon photonic subassembly 30. This mechanical registration creates a defined alignment between grooved lid 20 and silicon photonic subassembly 30. As will be more evident in the following drawings, grooved lid 20 further comprises a plurality of grooves 26 formed on the underside thereof in the area as shown in FIG. 1.

As fiber holder 10 is slid into place over grooved lid 20 (as indicated by the arrows in FIG. 1), the individual optical fibers 42 of fiber array 40 will be captured by separate ones of the plurality of grooves 26. In accordance with the present invention, the plurality of grooves 26 are formed to tighten the accuracy of the alignment between the fibers and waveguides formed on subassembly 30 along the z-axis direction (i.e., the elevation of fiber array 40 with respect to silicon photonic subassembly 30). Grooved lid 20 also functions to direct the fibers into a plurality of etched channels 38 formed along an endface 36 of silicon photonic subassembly 30. Channels 38 are precisely etched alignment features, formed along endface 36 of subassembly 30, and provide the final x-y adjustments to the alignment between fiber array 40 and a plurality of waveguides (or other optical transmitting/receiving components) formed within silicon photonic subassembly 30.

The details of the various pieceparts forming the alignment configuration of the present invention will now be discussed in detail below, with reference to the remaining drawings. It is to be understood that while the following discussion of the details of the present invention refer to the alignment of an optical fiber array with a silicon photonic subassembly, the principles of the present invention are equally applicable to situations where only a single fiber needs to be aligned with and attached to a silicon photonic subassembly.

Figure 2:
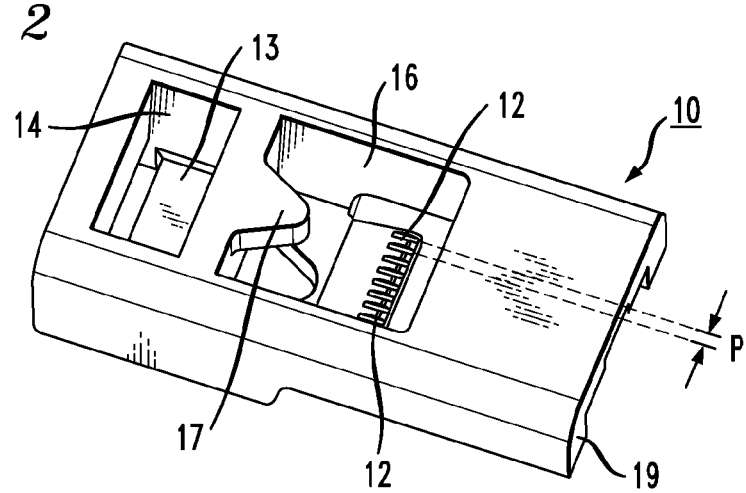
FIG. 2 is an isometric top view of an exemplary fiber holder piecepart formed in accordance with the present invention.

FIG. 2 is an isometric view of an exemplary fiber holder 10 formed in accordance with the present invention. As mentioned above, fiber holder 10 may be manufactured out of any standard, relatively inexpensive material, such as a polymer, ceramic or metallic composition. A plurality of grooves 12 are formed within a base portion of fiber holder 10 and are separated by a predetermined spacing. Fiber holder 10 is utilized in the alignment configuration of the present invention to define an approximate pitch P (i.e., fiber-to-fiber spacing) for the fiber array, as defined by the spacing between adjacent grooves 12. It is possible, for example, to provide a pitch P on the order of 0.25 μm (although other values for pitch may be employed for various other configurations). As will be discussed below, when joined to the remaining components, fiber holder 10 also positions the fibers for presentation to grooved lid 20 (for example, positioning with a tolerance of approximately ±15 μm along the x-axis and approximately ±100 μm along the z-axis). Also shown in FIG. 2 is a pair of observation windows 14 and 16 that are formed within fiber holder 10 to allow for an individual to observe the insertion and placement of fiber array 40 with respect to fiber holder 10. Windows 14 and 16 are for the convenience of the user and do not necessarily form part of the present invention.

Figure 3:
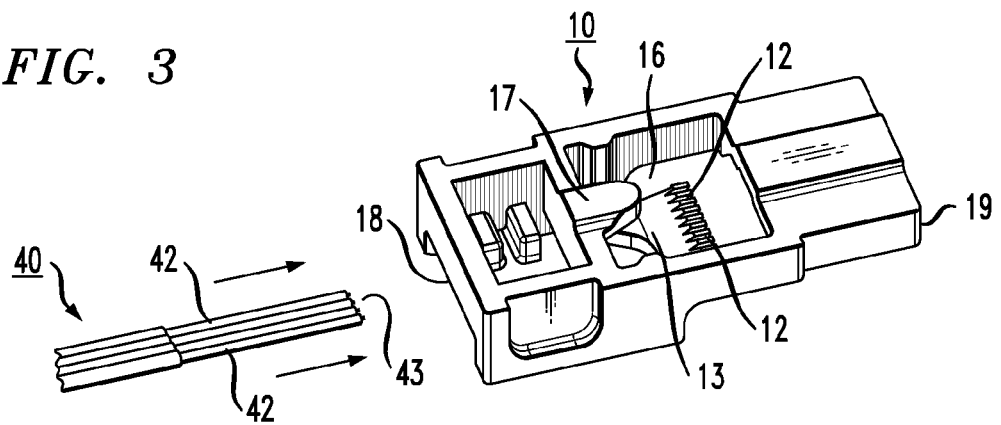
FIG. 3 is an exploded view of the fiber holder of FIG. 2 with an associated fiber array, illustrating the direction in which the fiber array is inserted into the fiber holder.

FIG. 3 illustrates the step of inserting fiber array 40 into an end opening 18 of fiber holder 10. As shown, fiber array 40 comprises a plurality of separate optical fibers 42, which are all capable of independent movement at this point. Fiber array 40 is guided into fiber holder 10 such that the "bare" individual fibers 42 first pass through end opening 18 and then come to rest upon the plurality of grooves 12. Window 16 may be used by an individual to assist in the placement of the individual fibers 42 into their associated grooves 12.

Figure 4:
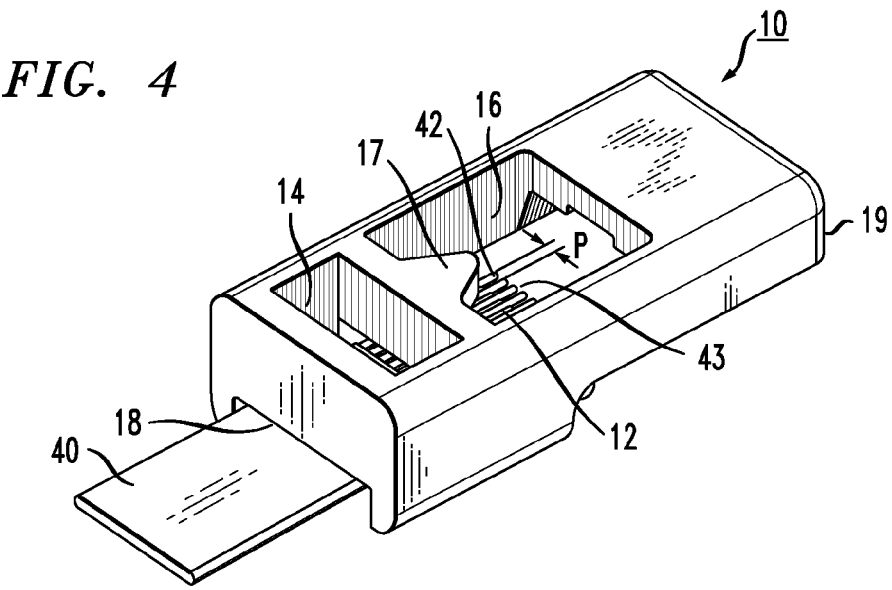
FIG. 4 illustrates the fiber holder of FIG. 2, with a fiber array fully inserted as indicated by the arrows shown in FIG. 3.

FIG. 4 illustrates the final portion of this first step in the alignment and attachment process, with fiber array 40 positioned within, and affixed to, fiber holder 10. As shown, fibers 42 are disposed within the individual grooves 12, thus creating the desired pitch P between adjacent fibers. At this point in the process, however, the absolute positioning of fibers 42 remains poorly controlled along both the "y" and "z" directions. Conventional cleaving technologies may then be employed to cleave the endface terminations 43 of optical fibers 42 to define the y-direction positioning of array 40 to a desired value (for example, ±10 μm) with respect to sidewall termination 19 of fiber holder 10. It is to be noted that various other techniques may be used to prepare endface terminations 43 and provide a relatively fixed positioning of endface terminations 43 with respect to fiber holder 10.

Figure 5:
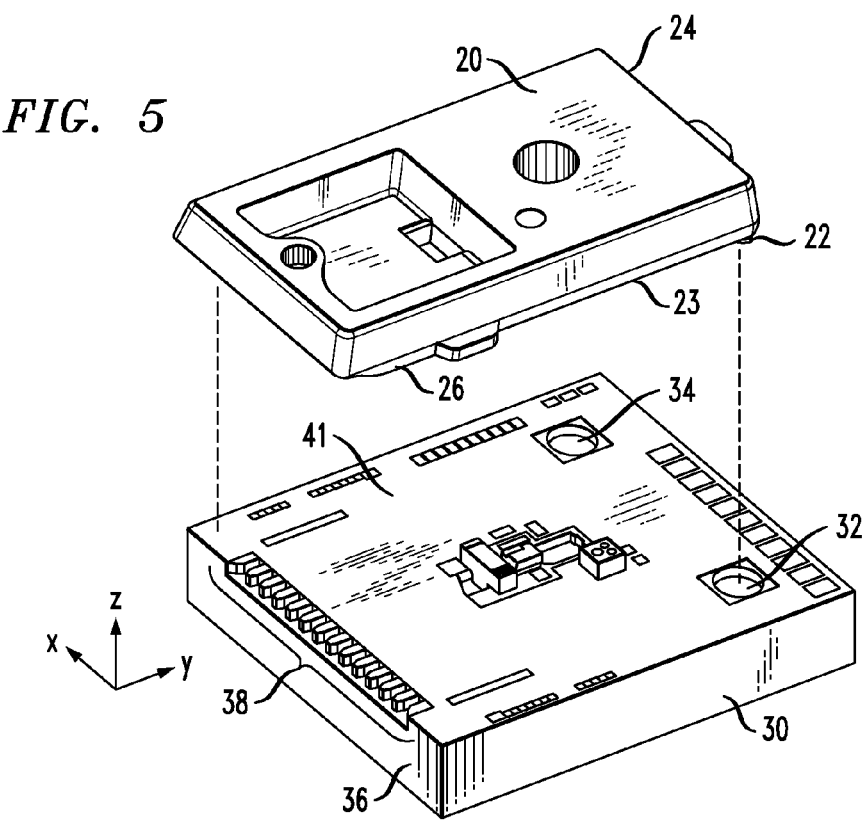
FIG. 5 is an exploded isometric view of an exemplary grooved lid and silicon photonic subassembly, showing the orientation of the pieceparts and the direction used to mate them together through the registration features of the grooved lid and the alignment detents of the subassembly.
Figure 6:
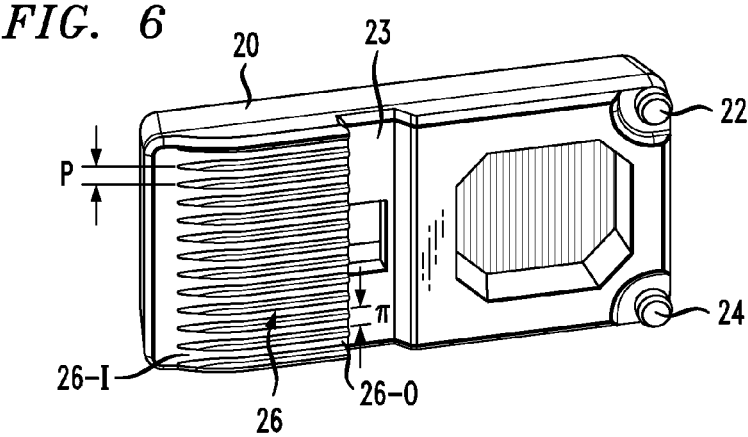
FIG. 6 is an isometric view of the underside of the grooved lid, shown in particular the registration features and the plurality of fiber-capturing grooves.
Figure 7:
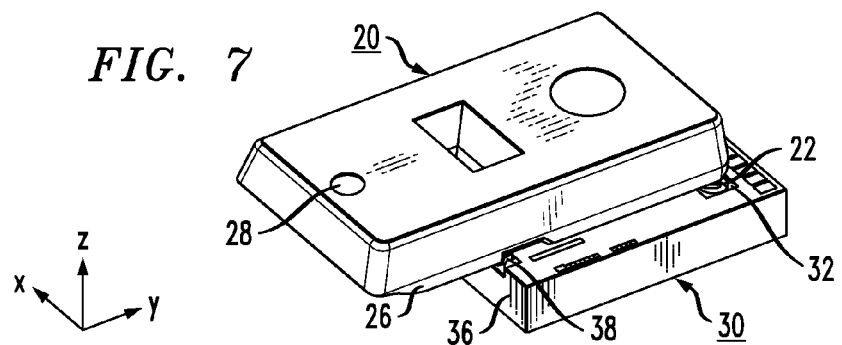
FIG. 7 is an isometric view of the mated combination of the grooved lid and the silicon photonic subassembly.

As mentioned above, grooved lid 20 and silicon photonic subassembly 30 are configured to be joined together in a manner that provides both physical attachment and mechanical registration therebetween. FIGS. 5, 6 and 7 illustrate this aspect of the inventive alignment configuration. FIG. 5 is an exploded, isometric view of grooved lid 20 and silicon photonic subassembly 30, showing the orientation of these two components as they are joined together. Again, it is to be understood that grooved lid 20 may be formed of any suitable material, such as a polymer, ceramic, metallic composition, or the like. For operational purposes of the final photonic system, subassembly 30 is necessarily formed of silicon and includes optical waveguides and various other optical and/or optoelectronic devices (not specifically shown) integrated therein.

As mentioned above and described in detail below, grooved lid 20 is formed to include a plurality of mechanical registration features, in this case comprising a pair of registration features 22 and 24. Referring to FIG. 6, registration features 22 and 24 are shown as formed on underside 23 (shown as the shaded surface of varying height) of grooved lid 20. A similar plurality of alignment detents are formed on top surface 41 of silicon photonic subassembly 30. It is to be understood that the number of features, as well as their locations, are subject only to the design considerations of the user. The specific use of a "pair" of registration features and an associated "pair" of alignment detents is exemplary only and for the sake of illustrating the intent of the present invention.

Referring back to FIG. 5, the alignment detents in this particular embodiment comprise a pair of alignment detents 32 and 34. The relationship between the registration features on grooved lid 20 and alignment detents on silicon photonic subassembly 30 are well-controlled such that when grooved lid 20 is brought into contact with subassembly 30, the registration features and alignment detents will mate, providing mechanical attachment between these two pieceparts and an increased degree of optical alignment for the inventive interface component. Indeed, a mechanical registration between these components on the order of ±10 μm along all three axes is achieved in accordance with the configuration of the present invention.

As best shown in FIG. 6, grooved lid 20 further comprises a plurality of grooves 26 formed along underside 23. As will be discussed in detail below in association with FIGS. 8-10, the plurality of optical fibers 42 will enter these grooves 26 as fiber holder 10 is mated with the previously-joined combination of grooved lid 20 and subassembly 30. By controlling the depth of grooves 26, the z-direction alignment of optical fibers 42 with respect to silicon photonic subassembly 30 will be fixed with a precision on the order of approximately ±10 μm. FIG. 7 illustrates the final attachment of grooved lid 20 to silicon photonic subassembly 30. As a result of the known placement of registration features 22, 24 and alignment detents 32, 34, the relative position of channels 38 with respect to grooves 26 is well-controlled.

Silicon photonic subassembly 30 is also shown as including a plurality of channels 38 formed along endface 36 thereof. Channels 38 are formed from etching and processing endface 36 using known CMOS processing techniques, where by the use of silicon as the base material for subassembly 30, the dimensions and spacing of channels 38 are well-controlled and reproducible. As will be discussed below in association with FIGS. 8-10, channels 38 function to accept endface terminations 43 of optical fibers 42 and direct them into a final pitch and positional accuracy. Indeed, channels 38 are capable of providing accuracy on the order of ±2 μm along both the x-axis and y-axis of the final interface structure. It is to be noted, however, that in certain implementations the alignment tolerance along the y-axis may be slightly relaxed to avoid damage to sensitive optical elements disposed along endface 36 of silicon photonic subassembly 30 (that is, relaxed to avoid direct physical contact between optical fiber endface termination 43 and subassembly 30).

In further accordance with the present invention, fiber holder 10 (including fiber array 40) is in contact with grooved lid 20, which itself is mated with and aligned to silicon photonic subassembly 30. FIG. 1, as discussed above, shows the orientation of the fiber holder 10 with respect to lid 20/subassembly 30, as well as the direction of movement used to insert fiber holder 10 in place over the combination of lid 20 and subassembly 30. When joined, a registration feature 17 on fiber holder 10 will engage with an alignment detent 28 formed on the top surface of grooved lid 20 (referred to as a "ball and socket" mechanical alignment mechanism). Obviously, various other types of mechanical registration and attachment arrangements may be used to join fiber holder 10 to grooved lid 20. Moreover, the order in which the separate components are joined may be varied; that is, fiber holder 10 may first be mated with grooved lid 20, and the combination of holder 10/lid 20 then attached to subassembly 30.

Figure 8:
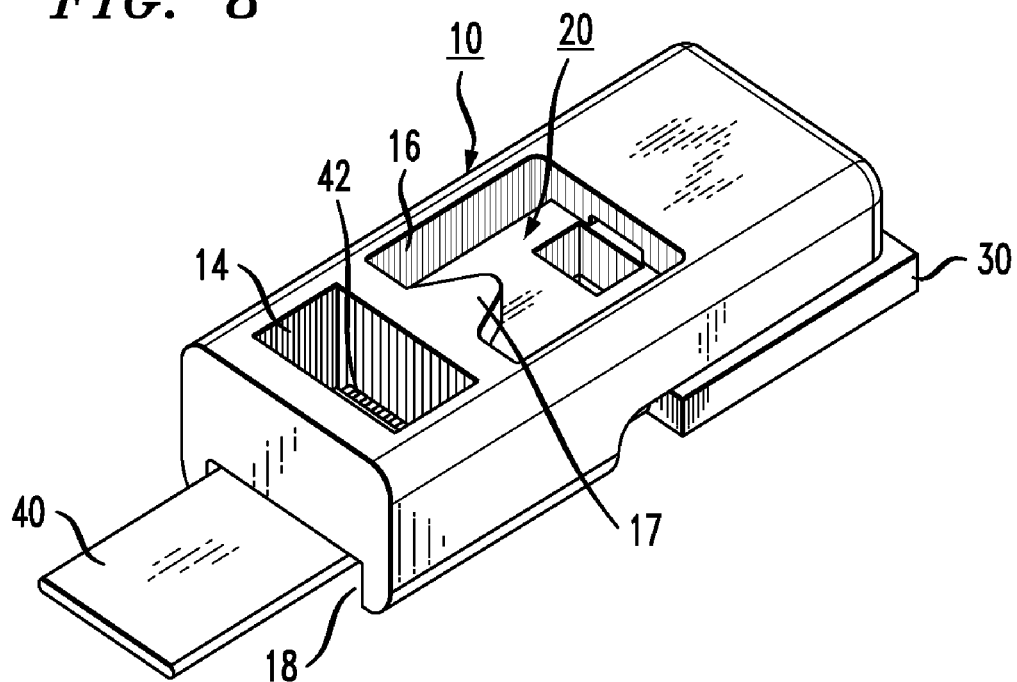
FIG. 8 is an isometric view of the completely assembled fiber array interface and alignment structure of the present invention.
Figure 9:
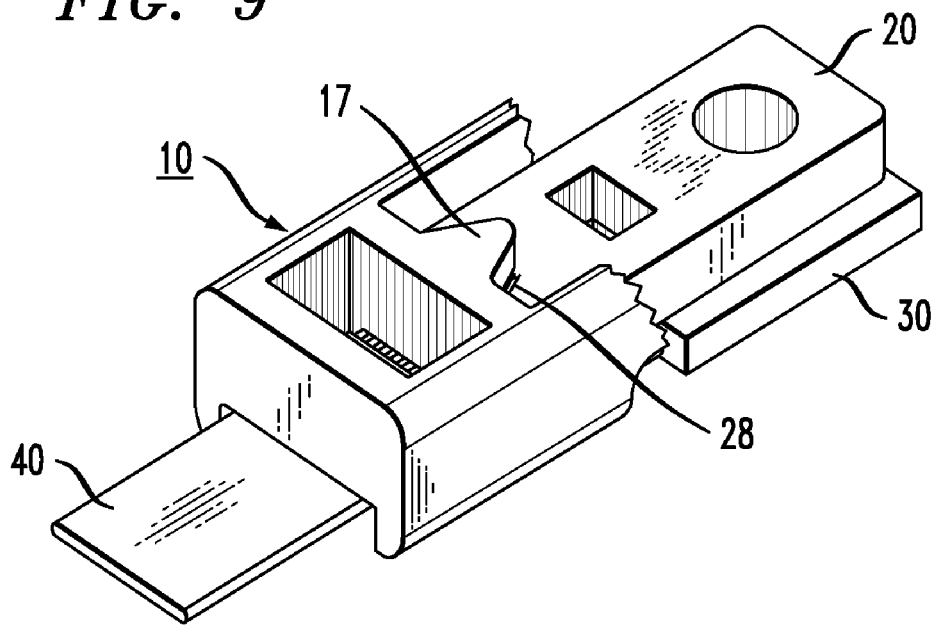
FIG. 9 is a view of the same arrangement as shown in FIG. 8, with a portion of the fiber holder removed to illustrate the location of the grooved lid underneath the fiber holder.

FIG. 8 shows the final arrangement of the multiple piecepart alignment configuration of the present invention, capable of providing alignment between fiber array 40 and silicon photonic subassembly 30. A cut-away view of the arrangement of FIG. 8 is shown in FIG. 9, illustrating the location of grooved lid 20 as encased by fiber holder 10 upon mating.

Figure 10:
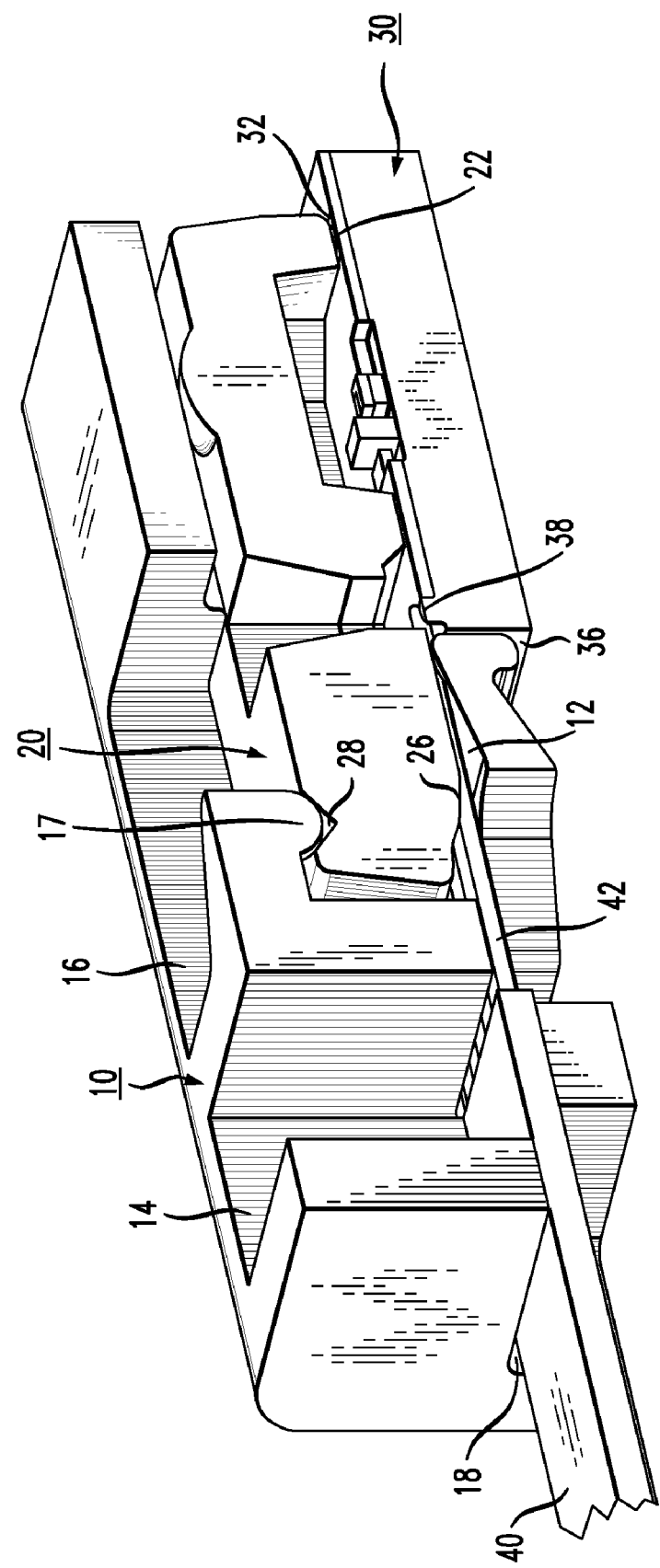
FIG. 10 is a cut-away isometric view of the assembled fiber array interface and alignment structure of FIG. 8.

FIG. 10 is an isometric, cut-away view illustrating the various grooves, registration features, alignment detents and channels used to form the multiple piecepart alignment configuration of the present invention. In summary, fiber holder 10 includes a plurality of grooves 12 for supporting the individual optical fibers 42 forming fiber array 40. Grooves 12 are spaced to provide an initial "pitch" P (fiber-to-fiber spacing). Grooved lid 20 also including a plurality of grooves 26, formed on underside 23 thereof, which will capture fibers 42 as fiber holder 10 is slid into place over grooved lid 20. As a result, the individual optical fibers 42 will be encased between grooves 12 (below the fibers) and grooves 26 (above the fibers). Ball and socket arrangement 17, 28 provides mechanical attachment and alignment between fiber holder 10 and grooved lid 20. The mechanical alignment between registration features 22, 24 of grooved lid 20 and alignment detents 32, 34 of silicon photonic subassembly 30 functions to set the z-axis positioning of fiber array 40 with respect to subassembly 30. Grooved lid 20 restricts the position of optical fibers 42 to approximately 20 µm of silicon photonic subassembly 30.

Figure 11:
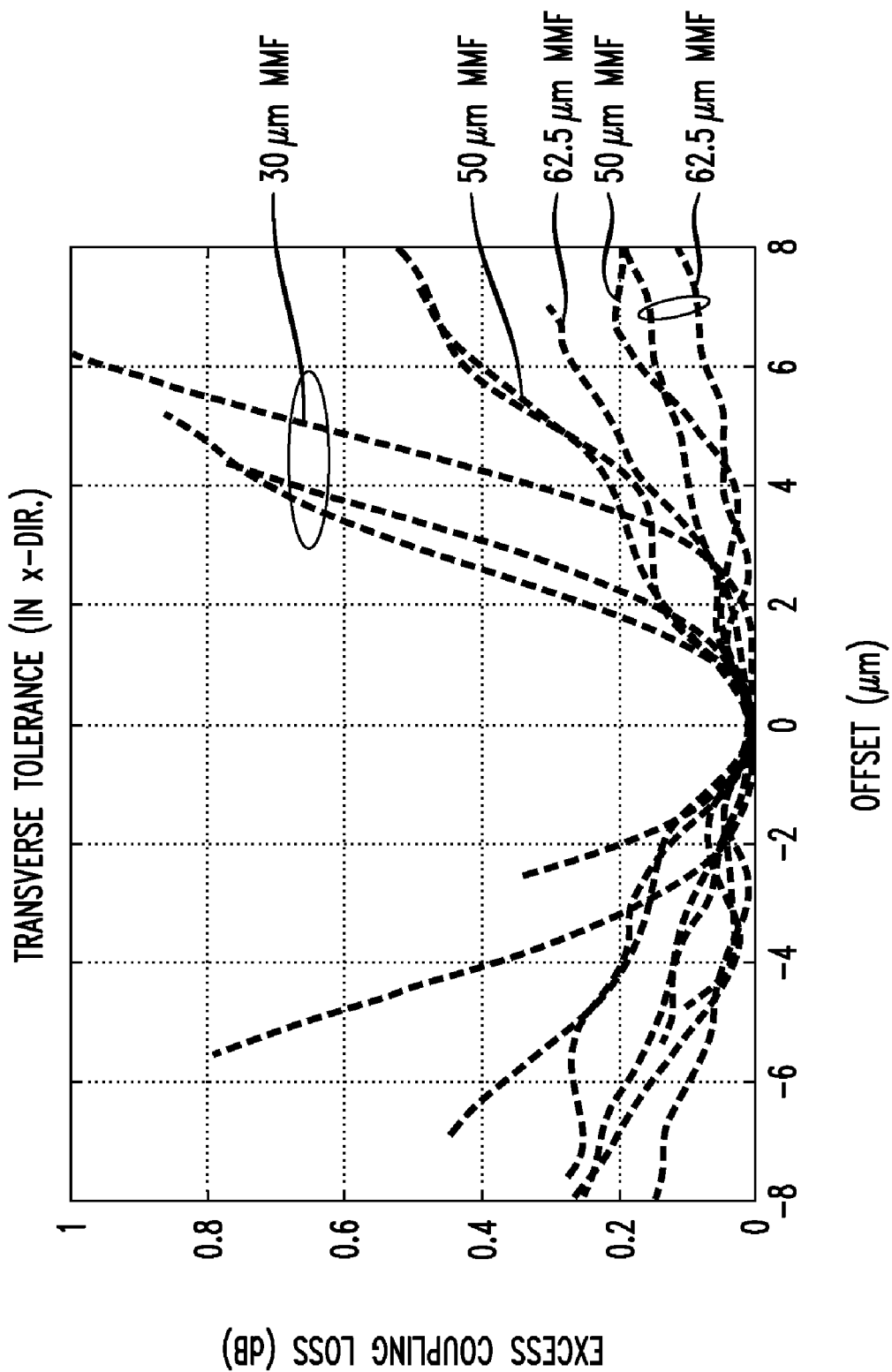
FIG. 11 is a graph illustrating the coupling loss, as measured in dB, as a function of transverse offset between an incoming fiber array and a silicon photonic subassembly, as measured for multimode fibers of different diameters.

FIG. 11 is a graph depicting the relationship between alignment accuracy and coupling loss for the multiple piecepart alignment configuration of the present invention. The coupling loss (as measured in dB) is plotted on the y-axis, as a function of the transverse misalignment (x-axis) between a multimode optical fiber 42 and an optical waveguide formed on silicon photonic subassembly 30. The offset is measured in microns, and different plots are associated with multimode fibers of various core diameters (in this case, 30, 50 and 62.5 µm). It is shown that coupling loss is more problematic with smaller diameter fibers, with the 62.5 µm fiber exhibiting the smallest dependence on transverse misalignment.

While the exemplary arrangements as described above, therefore, are representative of the invention, the spirit and scope of the present invention is considered to be limited only by the claims appended hereto.

What is claimed is:

1. A multiple piecepart alignment configuration for mating at least one optical fiber with a silicon photonic subassembly including a plurality of optical waveguides, the multiple piecepart alignment configuration comprising:

a box-shaped fiber holder component including a plurality of grooves formed along an inner surface of a bottom portion of the box-shaped fiber holder, each groove for supporting a separate optical fiber of the at least one optical fiber upon insertion into a side opening of the box-shaped fiber holder, the plurality of grooves spaced apart to define an initial, approximate pitch for fiber-to-fiber spacing;

a grooved lid component including a plurality of mechanical registration features formed in a first region of the underside of said grooved lid and a plurality of grooves formed in a second region of the underside of said grooved lid, the plurality of grooves for sliding over and encasing the at least one optical fiber disposed within the box-shaped fiber holder, the plurality of grooves configured to increase the accuracy of the initial, approximate pitch and refine the alignment; and a silicon photonic subassembly including a plurality of optical waveguides formed therein, the silicon photonic subassembly further including a plurality of alignment detents corresponding in size and location with the plurality of mechanical registration features formed on the underside of the grooved lid such that upon placing the grooved lid onto the silicon photonic subassembly, the plurality of mechanical registration features enter the plurality of alignment detents, providing alignment and mechanical attachment therebetween, the silicon photonic assembly further comprising a plurality of channels formed along an endface thereof adjacent to the box-shaped fiber holder, the plurality of channels for supporting endface terminations of the at least one optical fiber in alignment with the plurality of optical waveguides formed within the silicon photonic subassembly and configured to tighten accuracy of alignment between the at least one optical fiber and the plurality of optical waveguides, providing a final pitch and positional accuracy therebetween.

2. A multiple piecepart alignment configuration as defined in claim 1 wherein the at least one optical fiber comprises an optical fiber array consisting of a plurality of separate optical fibers.

3. A multiple piecepart alignment configuration as defined in claim 1 wherein the box-shaped holder comprises a material selected from the group consisting of: polymer, ceramic and metal.

4. A multiple piecepart alignment configuration as defined in claim 1 wherein the grooved lid comprises a material selected from the group consisting of: polymer, ceramic and metal.

5. A multiple piecepart alignment configuration as defined in claim 1 wherein the box-shaped fiber holder further includes at least one windows formed through a top surface thereof.

6. A multiple piecepart alignment configuration as defined in claim 1 wherein channels of the silicon subassembly comprise features etched into the top surface of said silicon photonic subassembly along an endface thereof.

* * * * *